(12) United States Patent
Joyner

(10) Patent No.: US 8,769,832 B1
(45) Date of Patent: Jul. 8, 2014

(54) UTENSILS HAVING ELEVATED DISTAL ENDS FOR PREVENTING GERMS AND CONTAMINATION

(76) Inventor: Michael Joyner, Delray Beach, FL (US)

( * ) Notice: Subject to any disclaimer, the term of this patent is extended or adjusted under 35 U.S.C. 154(b) by 288 days.

(21) Appl. No.: 13/423,835

(22) Filed: Mar. 19, 2012

Related U.S. Application Data

(60) Provisional application No. 61/454,267, filed on Mar. 18, 2011.

(51) Int. Cl.
*A47J 43/28* (2006.01)

(52) U.S. Cl.
USPC .................................. 30/322; 30/324; 30/340

(58) Field of Classification Search
USPC .................................. 30/322–324, 340, 123
See application file for complete search history.

(56) References Cited

U.S. PATENT DOCUMENTS

| | | | | |
|---|---|---|---|---|
| 868,583 | A | | 10/1907 | Schuyler |
| 2,387,765 | A | * | 10/1945 | Monnet .......................... 30/34.05 |
| 2,592,192 | A | * | 4/1952 | Sanford .......................... 30/326 |
| D167,623 | S | * | 9/1952 | Eue .................................. D7/648 |
| D168,016 | S | * | 10/1952 | Bermudez ....................... D7/663 |
| 2,751,683 | A | * | 6/1956 | Johns ............................. 30/324 |
| 2,787,055 | A | * | 4/1957 | Wertz ............................. 30/123 |
| 2,789,349 | A | | 4/1957 | Lee |
| 2,853,780 | A | * | 9/1958 | Bull ................................ 30/327 |
| 2,889,624 | A | * | 6/1959 | McDonald ..................... 30/324 |
| 3,259,132 | A | * | 7/1966 | Genes ............................. 30/324 |
| 3,805,444 | A | * | 4/1974 | Adickes ........................ 446/396 |
| 3,839,793 | A | * | 10/1974 | Crapio ............................ 30/123 |
| 3,854,478 | A | * | 12/1974 | Cunningham .................. 604/77 |
| 4,029,312 | A | * | 6/1977 | Wright .......................... 482/108 |
| 4,129,963 | A | * | 12/1978 | Perry et al. ..................... 446/325 |
| 4,283,808 | A | | 8/1981 | Beebe |
| 4,389,777 | A | * | 6/1983 | Landsberger .................. 30/324 |
| 4,599,797 | A | | 7/1986 | Bax |
| 4,715,914 | A | * | 12/1987 | Viner ............................. 156/94 |
| 4,719,702 | A | * | 1/1988 | Hoffman ........................ 30/326 |
| 4,779,344 | A | * | 10/1988 | Panisch ......................... 30/326 |
| 4,834,328 | A | | 5/1989 | Hall |
| 4,922,611 | A | * | 5/1990 | Levy .............................. 30/147 |
| 4,976,646 | A | * | 12/1990 | Hull ............................... 446/74 |
| 5,058,279 | A | | 10/1991 | Mars |
| 5,060,386 | A | * | 10/1991 | Mars .............................. 30/327 |
| 5,068,967 | A | | 12/1991 | Mars |
| D336,520 | S | * | 6/1993 | McDaniel ..................... D24/194 |
| D339,036 | S | * | 9/1993 | McDaniel ..................... D7/653 |
| 5,332,106 | A | | 7/1994 | Schlotte et al. |
| D362,790 | S | | 10/1995 | O'Connor et al. |

(Continued)

OTHER PUBLICATIONS http://www.amazon.com/Sassy-Less-Training-Spoon-Colors/dp/B002TOKHKS/ref=sr_1_14?ie=UTF8&s=baby-products&qid=1287603495&sr=1-14.

*Primary Examiner* — Sean Michalski

(74) *Attorney, Agent, or Firm* — H. John Rizvi; Gold & Rizvi P.A.

(57) ABSTRACT

The present invention relates to eating utensils including a support configuration adapted for elevating the utensil above a horizontal surface to prevent the contamination of germs or bacteria that may linger on the surface. The eating utensils are also adapted for use by children or adults having limited motor skills or dexterity. In one embodiment, a utensil such as a fork, knife or spoon is attached to an egg-shaped member having a weighted base and designed for preventing the utensils from coming into contact with horizontal surfaces such as a table.

4 Claims, 7 Drawing Sheets

(56) References Cited

U.S. PATENT DOCUMENTS

| | | | |
|---|---|---|---|
| 5,479,708 A | 1/1996 | Thomas | |
| D368,833 S | 4/1996 | Gibson et al. | |
| 5,592,744 A | 1/1997 | Weinstein | |
| 5,603,163 A | 2/1997 | Ikner, Jr. | |
| 5,630,276 A | 5/1997 | Weinstein | |
| 5,655,303 A * | 8/1997 | Janczak | 30/326 |
| 5,678,790 A | 10/1997 | Dwyer | |
| 5,709,423 A | 1/1998 | Romero | |
| 5,860,190 A | 1/1999 | Cano | |
| D407,274 S * | 3/1999 | Lake et al. | D7/655 |
| 5,890,223 A * | 4/1999 | Klemmer | 30/150 |
| 5,896,620 A * | 4/1999 | Mink | 16/110.1 |
| 5,946,807 A * | 9/1999 | Crane et al. | 30/141 |
| 5,950,280 A * | 9/1999 | Taylor | 16/422 |
| 6,027,151 A | 2/2000 | McNab et al. | |
| 6,049,936 A * | 4/2000 | Holley | 15/167.1 |
| 6,105,259 A * | 8/2000 | Meyers et al. | 30/323 |
| 6,134,790 A * | 10/2000 | Watson | 30/326 |
| D440,116 S | 4/2001 | Levie | |
| 6,363,568 B1 * | 4/2002 | Harrison et al. | 15/167.1 |
| D461,997 S * | 8/2002 | Jalet | D7/645 |
| 6,490,760 B1 * | 12/2002 | Lauer et al. | 16/436 |
| D476,198 S * | 6/2003 | Takowsky | D7/653 |
| 6,698,065 B2 * | 3/2004 | Lauer | 16/436 |
| D491,420 S * | 6/2004 | Shibata et al. | D7/653 |
| 7,231,719 B2 * | 6/2007 | Butcher | 30/196 |
| D588,203 S * | 3/2009 | Anderson | D21/405 |
| D592,019 S * | 5/2009 | Holcomb et al. | D7/643 |
| 7,574,776 B2 * | 8/2009 | Lawless | 16/436 |
| 7,805,843 B2 * | 10/2010 | Landsberger et al. | 30/147 |
| D641,595 S * | 7/2011 | Matari | D7/653 |
| 8,037,608 B2 * | 10/2011 | Schnak et al. | 30/45 |
| 8,387,263 B1 * | 3/2013 | Roberts | 30/324 |
| 2002/0073554 A1 * | 6/2002 | Chen | 30/169 |
| 2003/0019078 A1 * | 1/2003 | Lauer | 16/110.1 |
| 2003/0070514 A1 * | 4/2003 | Kilgore | 81/489 |
| 2004/0194322 A1 * | 10/2004 | Bullard et al. | 30/286 |
| 2005/0190647 A1 | 9/2005 | Rosati | |
| 2007/0084063 A1 * | 4/2007 | Hughes | 30/298.4 |
| 2007/0109797 A1 * | 5/2007 | Reda, Jr. | 362/418 |
| 2007/0209161 A1 * | 9/2007 | Neering et al. | 16/422 |
| 2008/0066317 A1 * | 3/2008 | Landsberger et al. | 30/147 |
| 2009/0077812 A1 * | 3/2009 | Malcolm et al. | 30/142 |
| 2009/0229130 A1 * | 9/2009 | Swierski et al. | 30/123 |
| 2012/0284943 A1 * | 11/2012 | Kalbfeld et al. | 15/167.1 |
| 2012/0295220 A1 * | 11/2012 | Thomas et al. | 433/89 |
| 2013/0321262 A1 * | 12/2013 | Schecter | 345/156 |

\* cited by examiner

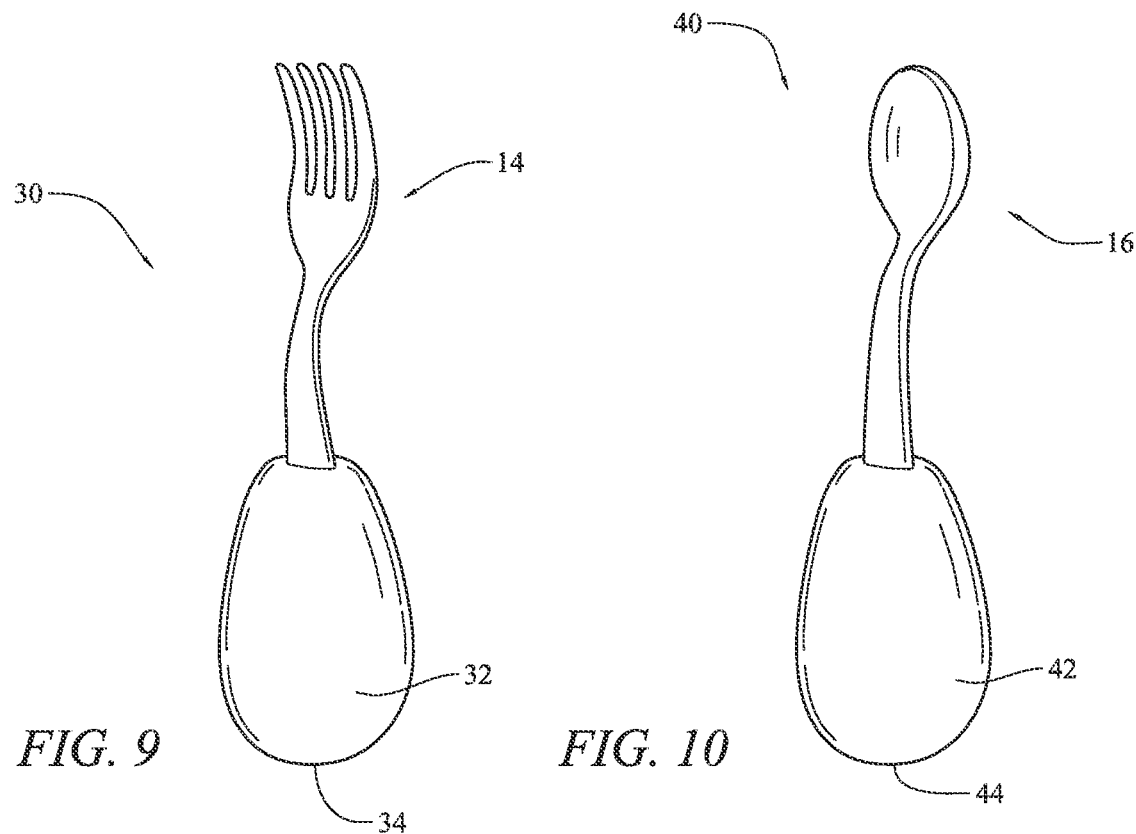
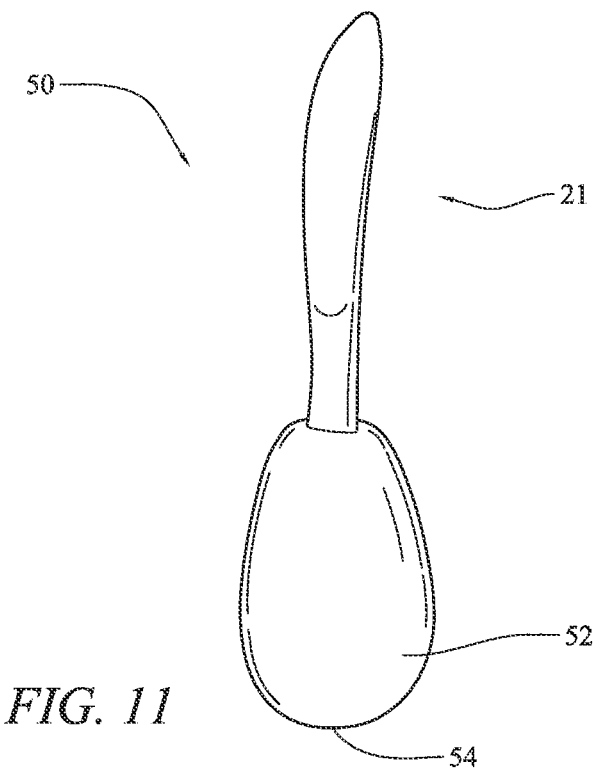
FIG. 9  FIG. 10
FIG. 11

UTENSILS HAVING ELEVATED DISTAL ENDS FOR PREVENTING GERMS AND CONTAMINATION

CROSS-REFERENCE TO RELATED APPLICATION

This application claims the benefit of U.S. Provisional Patent Application Ser. No. 61/454,267 filed Mar. 18, 2011, which is incorporated herein in its entirety.

FIELD OF THE INVENTION

The present invention relates generally to utensils. More particularly, the present disclosure relates to eating utensils including a support configuration adapted for elevating the eating utensil above a surface to avoid contamination. Further, the present disclosure provides eating utensils adapted for use by children or adults having limited motor skills or dexterity.

BACKGROUND OF THE INVENTION

Developing the physical coordination required for proper eating habits is one of the challenges that young children face during their early years. The limited dexterity that young children have with their hands makes it difficult for children to learn the proper mariners in grasping, handling, and using eating utensils. In addition, many adults may also have trouble using common flatware due to physical disabilities or diminished motor skills. For example, the elderly often suffer from physical impairments such as Parkinson's disease, severe arthritis, or overall weakness. Such physical impairments provide limited motor control and difficulty in manipulating eating utensils in everyday living.

Prior art is congested with various renditions of eating utensils that are designed to provide handles for enhancing the gripping abilities of individuals. Conventionally, most eating utensils include a distal operating end integrally attached to a shank defining a handle. The distal operating end typically comprises a blade of a knife, a spoon, or a plurality of curved tines that form a fork. The dimensional configuration of the flat shank often makes it difficult for small children or physically challenged individuals to effectively grasp. As a result, the utensils are awkwardly positioned during use or often fall to the floor.

As such a large majority of prior art eating utensils are mainly directed at the constructional aspects of improving the gripping handle of the utensil. Many devices have improved the shank portion of the traditional eating utensils by providing enlarged handles, handles including friction-enhancing features such as dimples, longitudinally spaced indentations, or raised ridges, and handles including a foam or cushion to provide comfort during use. Still, other special need utensils have been designed to also address other challenging situations. For example, self-leveling spoons have also been implemented to allow individuals to feed themselves without spilling food. Some utensils include tethers or straps that are removeably attached to the wrist of a user to prevent the utensil from falling to the floor in the event the user releases the utensil.

Though the newly constructed prior art eating utensils better assist the elderly and small children in holding and grasping the instrument, such devices fail to provide a hygienic solution in reducing and preventing germs from contaminating the utensil. For example, when handling eating utensils, adults usually place the utensils on a dinner table, in a sink, within a plate, or simply store the utensils in a drawer when not in use. Also, on many occasions, infants will place utensils on a highchair table, in a plate directly in front of them, or as is often the case, the child inadvertently drops the eating utensil on the floor. As traditional prior art eating utensils are placed on a horizontal surface, the distal operating end comes in contact with the surface thus potentially contaminating the eating utensil with germs and bacteria. Many surfaces are dirty, and include contaminants, germs and bacteria if not washed regularly. As a result, a contaminated eating utensil can pose a health risk to both the infant and adult. To safely reduce or eliminate germs and bacteria that may have contaminated the distal operating end of the eating utensil, the utensil must be repeatedly washed after coming into contact with a surface. Few, if any solutions have been adopted to address this concern.

The conventional prior art has effectively addressed some concerns provided by traditional eating utensils, however, there remains a need for an eating utensil that is adapted for use by small children or adults with physical impairments, is safe and easy to use, and configured to elevate the distal operative end of the utensil when the utensil is disposed on a surface to avoid contamination of the utensil.

SUMMARY OF THE INVENTION

In one general aspect of the present invention, there is provided an eating utensil comprising an implement including a distal operative member integrally formed with a Shank, a handle including an elongated body having an hour-glass shape with a concave middle section terminating at a front end and a hack end, where at least the front end is diametrically larger than the size of the middle section of the handle forming a gap between the middle section and a horizontal surface when the handle is placed on a horizontal surface, the shank being coaxially attached to the handle, and wherein the front end is dimensionally configured to elevate the distal operative member above the horizontal surface a predetermined distance when the front end is placed on the surface.

The implement includes any one of a fork, a knife, a spoon, a ladle, a spatula, a scoop, a whisk, an ice cream scoop, a turner, or any other handheld tool.

A second aspect of the invention provides a self-positioning utensil comprising an implement having a distal operative end integral an elongated shank, an egg-shaped member including a weighted base and a slot formed within the egg-shaped member, where the weighted base is configured for maintaining the egg-shaped member in vertical orientation when the egg-shaped member sits on a horizontal surface, and wherein the shank is permanently or removeably secured within the slot so that the distal operative end extends outwards from the egg-shaped member.

In another aspect of the invention, the slot extends partially within the egg-shaped member terminating near the weighted base such that the implement is coaxially aligned along the longitudinal axis of the egg-shaped member when the shank of the implement is disposed within the lot. Alternatively, the slot extends completely and laterally through the egg-shaped member such that the implement is perpendicular to the egg-shaped member when the shank of the implement is disposed within the slot.

In yet another aspect of the invention there is provided a utensil for manipulating food comprising, an elongated body having a distal operative member at one end, the elongated body having a top surface and a bottom surface, opposite the top surface, a first support attached to the elongated body forming a first projection extending downwards from the bottom surface, a second support attached to the elongated body forming a second projection extending downwards from the bottom surface, the first support spaced apart from the second support, and wherein the supports elevate the distal operative member a distance above a horizontal surface when the elongated body is placed on the surface.

These and other advantages of the invention will be further understood and appreciated by those skilled in the art by reference to the following written specifications, claims and appended drawings.

BRIEF DESCRIPTION OF THE DRAWINGS

The invention will now be described, by way of example, with reference to the accompanying drawings, in which:

FIGS. 9, 10 and 11 present perspective views of different eating utensils, each showing an operative member oriented vertically within an egg-shaped member, in accordance with yet another embodiment of the present invention;

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in the perspective views of each Figure. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Operative members 14, 16 and 21 are shown throughout FIGS. 1 through 19 presenting exemplary embodiments of a fork, a spoon, and a knife, respectively. Such operative members 14, 16, 21 are provided for illustrative purposes only and are not intended to be a limitation on the spirit and scope of the present invention.

Figure 1:
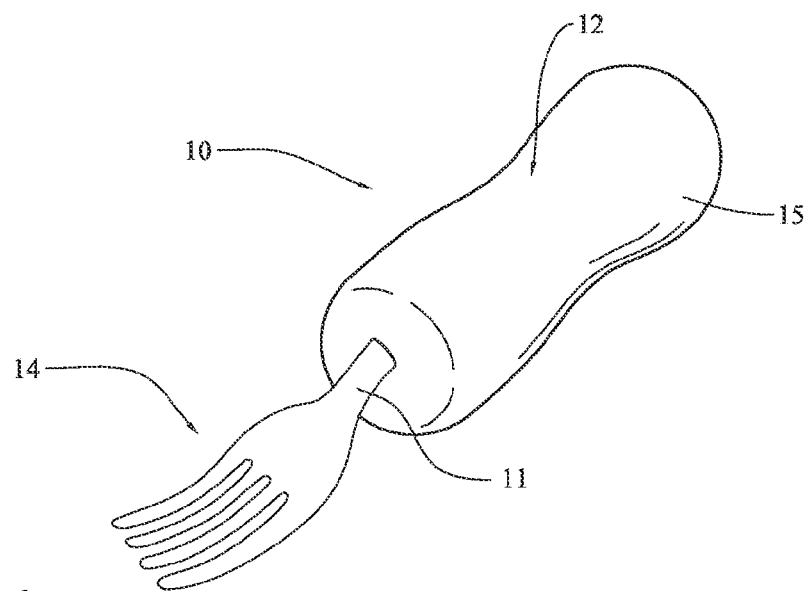
FIG. 1 presents a perspective view of an exemplary eating utensil including a handle and fork, in accordance with one embodiment of the present invention.

A perspective view of an exemplary eating utensil 10 is illustrated in FIG. 1. The eating utensil 10 comprises a handle 12 and a distal operative member 14, wherein the operative member 14 is shown as a plurality of curved tines integrated with a shank 11 to form a fork. The fork may be fabricated from a durable plastic material or metal such as stainless steel.

The handle 12 is dimensioned and configured to provide a user with a comfortable grip and to facilitate maneuverability of the utensil 10 by a user who may be lacking coordinated motor skills or suffering from a physical impairment. In this context, the handle 12 includes a body 15 having hourglass shape including a concave middle section extending and terminating at a front end 17 and a back end 19. The hourglass shape is apparent respective to a longitudinal axis of the utensil 10. The hourglass contour provides a space or gap under the body 15 to permit the handle 12 to be easily picked up by a user. In one non-limiting embodiment, distal operative member 14 is secured to the front end 17 of the handle 12. In yet an alternative embodiment, body 15 includes a longitudinally extending slot that terminates near the back end 19. The slot is sized and dimensioned to receive the shank 11 axially within the body 15 of the handle 12 where the shank 11 may be permanently or temporarily affixed to or within body 15 of handle 12 by any bonding agent, mechanical fastener, or welding and compressing techniques. Alternatively, the body 15 may include internal friction grips, detents, dimples or other mechanisms designed to temporarily hold the shank 11 within the handle 12 allowing functional members 14 to be easily interchanged, removed for washing, or replaced. In the preferred embodiment, handle 12 is essentially a cylindrical body 15 which can be fabricated from any suitable material including, but not limited to, plastic, hard rubber, ceramic, wood, and the like. In yet an alternative embodiment, the operative member 14, the shank 11 and the handle 12 can be constructed as one integral unit or piece using well-known injection molding techniques. The integral fabrication may reduce costs by eliminating the need for assembly. Further, it is contemplated that the body 15 can be fabricated having other suitable geometrical shapes that may include an elongated triangular shape, hexagon, octagon, pentagon or other forms.

To prevent slippage when grasping the eating utensil 10, the handle 12 may include friction-enhancing features such as longitudinal grooves, indentations, ridges, or a plurality of dimples that are disposed or formed on the outer surface of the body 15. A pliant grip or coating may also be disposed upon the outer surface of the body 15 of the handle 12 to help eliminate germs, provide water resistance, or simply to enhance the aesthetic or structural integrity of the handle 12.

Figure 2:
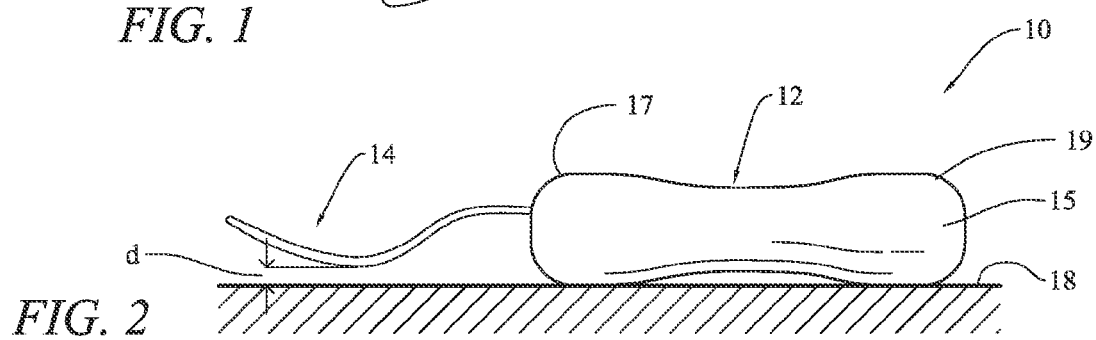
FIGS. 2, 3 and 4 present side views of the eating utensil of FIG. 1, showing the utensil resting on a horizontal surface with a distal operative member elevated above the surface.
Figure 3:
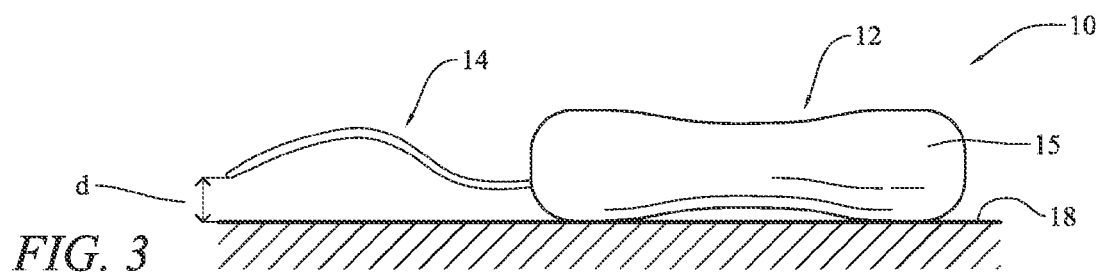
Figure 4:
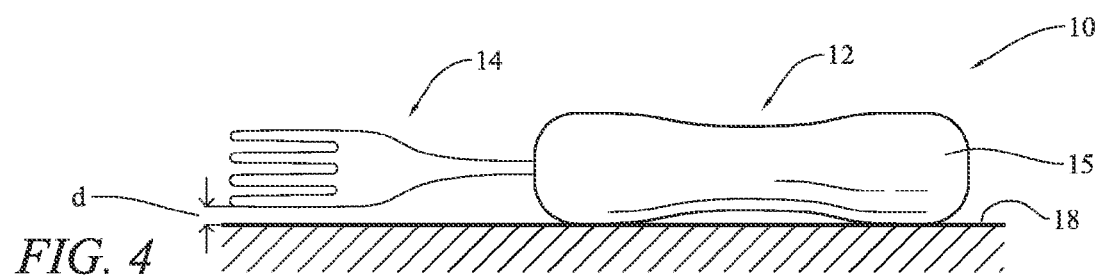

As better illustrated in FIGS. 2 through 4, when the eating utensil 10 is placed on a support surface 18, the operative member 14 of the utensil 10, as represented by the exemplary fork, is elevated from the surface 18 a predetermined distance d to prevent the member 14 from coming into contact with the surface 18. This optimum feature prevents the fork 14 from being contaminated with germs or bacteria that may linger on the surface 18. In one embodiment, to achieve this goal, the shank 11 is positioned axially within the slot that is offset from the central longitudinal axis of the body 15. The location of the shank 11 within the body 15 of the handle 12 or the diametrical size or circumferential measure of the front and back ends 17, 19, respectively, operatively define the distance d in which member 14 is elevated from the surface 18. As shown, the beneficial feature of the present invention allows a user to rest the eating utensil 10, in any orientation, on a horizontal surface 18 to prevent contamination of the fork and promote hygiene. Thus, whether the eating utensil 10 is placed in an upright position, an inverted position, or on its side, on a surface 18, the operative member 14 is consistently elevated above the surface 18 a predetermined distance d, as better illustrated in FIGS. 2 through 4, in one exemplary embodiment, a portion of the from and back members 17, 19 may include a flat surface area to prevent the eating utensil 10 from rolling along surface 18. It will be noted that the shape and size of the body 15, and/or front and back ends 17, 19 may comprise any suitable shape and size to define the distance d. The handle 12 may also include weights or a ballast to help retain the eating utensil 10 in place.

Figure 5:
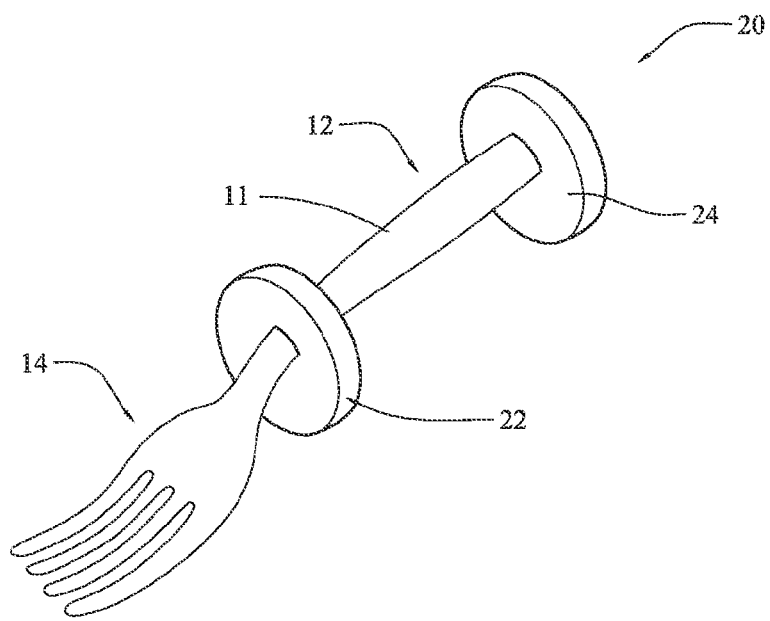
FIG. 5 presents a perspective view of an eating utensil including a fork having a shank and individual supports, in accordance with a second embodiment of the present invention.
Figure 6:
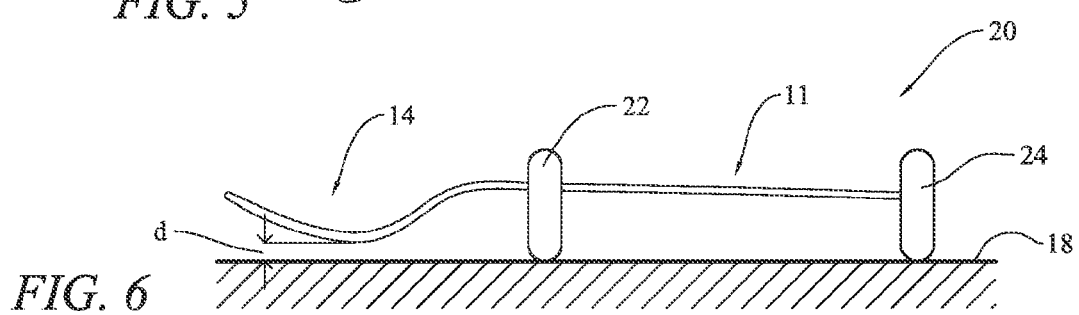
FIGS. 6, 7, and 8 present side views of the eating utensil of FIG. 5, showing the utensil resting on a horizontal surface with a distal operative member elevated above the surface.
Figure 7:
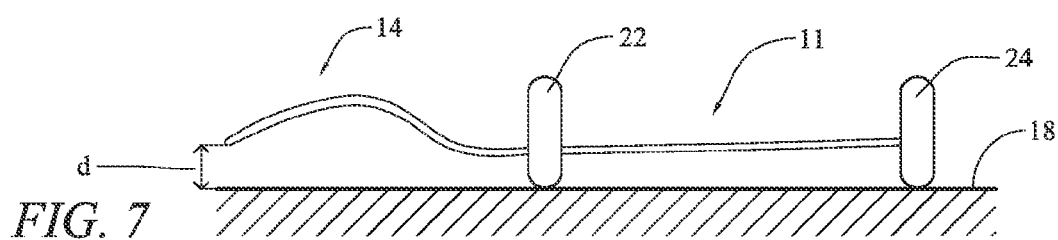
Figure 8:
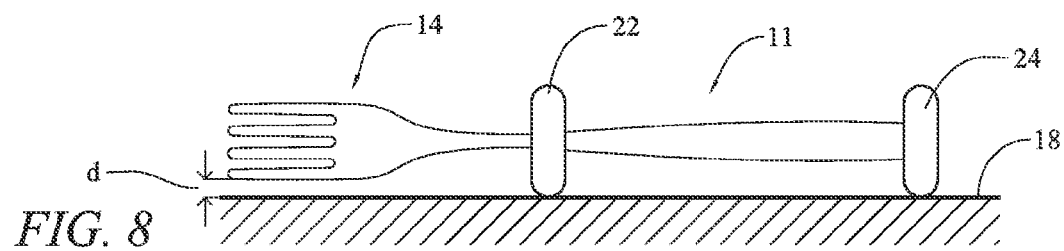

FIGS. 5 through 8 illustrate a second embodiment of the present invention in which an eating utensil 20 is configured to prevent the contamination of an operative member 14 when the eating utensil 20 is placed on a surface 18. FIG. 5 depicts a perspective view of an eating utensil 20 including an operative member 14 comprising a fork, for illustrative purposes, integrally formed with a shank 11.

The eating utensil 20 further includes two supports 22, 24, each adapted to be permanently or temporarily mounted onto shank 11. Although supports 22, 24 are depicted as cylindrical shapes, supports 22, 24 may comprise any geometrical shape and dimension needed to provide a distance d. Also, to enhance the artistic appearance, in one exemplary embodiment, supports 22, 24 may comprise a motif or simulative of an object, article, character or the like. For example, each support 22, 24 may comprise a cartoon character that is appealing to infants. The supports 22, 24 may be manufactured from different materials, including plastic, foam, hard rubber, wood, ceramic, and the like. The supports 22, 24 may be retrofitted to attach to conventional flatware and cutlery, as further illustrated in FIG. 18. Alternatively, the supports 22, 24 can be integrally formed with the shank 11 of each eating utensil 20 using well known injection molding techniques.

Preferably, an aperture is formed completely through the body of each support 22, 24 to securely receive the shank 11 of flatware. A bonding agent, mechanical fasteners, or welding and compressing techniques may be employed to affix the shank 11 securely within each support 22, 24. Alternatively, the supports 22, 24 may include detents, or other mechanisms for releasably attaching the supports 22, 24 onto the shank 11 of conventional flatware allowing a user to interchange, remove or replace flatware. As better illustrated in FIGS. 5 through 8, when the eating utensil 20 rests on a support surface 18, the operative member 14 of the utensil 20, shown as a fork in the illustrative embodiment, is elevated from the surface 18 by a predetermined distance d to prevent the member 14 from coming into contact with the surface 18. The elevation distance d prevents the fork 14 from being contaminated with germs or bacteria that may linger on surface 18. To achieve this benefit, the shank 11 may be axially disposed within each support 22, 24 in an area that is offset from the central region of supports 22, 24. Thus, the axial disposition of the shank 11 within the supports 22, 24, or the diametrical size and relative shape of the supports 22, 24, or both, define the elevational distance d of member 14. As shown, the beneficial feature of the present invention allows a user to place the eating utensil 20 in any orientation, on a horizontal surface 18, to avoid contaminating the fork 14. Thus, whether the eating utensil 20 is situated in an upright position, an inverted position or set on its side, on a surface 18, the fork 14 is consistently elevated from the surface 18 a predetermined distance d, as better illustrated in FIGS. 6 through 8.

Turning now to FIGS. 9 through 11, there are shown perspective views of eating utensils, in accordance with alternative embodiments of the present invention. Eating utensils 30, 40, 50 include an operative member 14, 16, 21, respectively, shown herein for illustrative purposes as comprising a fork, a spoon and a knife, each integral with a shank 11. The shank 11 of each eating utensil 30, 40, 50 is disposed, in vertical orientation, within or attached to an egg-shaped member 32, 42, and 52 that defines a handle. In one non-limiting embodiment, each egg-shaped member 32, 42, 52 may include a longitudinally extending slot dimensioned to receive the shank 11 of each eating utensil 14, 16, 21 therein. A bonding agent, mechanical fasteners or welding or compression techniques may be used to secure the shanks 11 firmly within the member 32, 42, 52. Alternatively, the slot may include detents or mechanical elements that firmly engage with the outer surface of the shank 11 to releaseably hold the shank 11.

The egg-shaped member 32, 42, 52 may be constructed from a durable, material such as plastic, ceramic, wood, hard rubber, or metal. For safety purposes, the material selected should be shatter resistant to prevent injury if damaged. It should be noted that the size of each egg-shaped member 32, 42, 52 is selected to accommodate proper handling and control when handled by a child or adult. For example, since children have smaller hands, the egg-shaped member 32, 42, 52 would include smaller dimensions and sizes to accommodate smaller hands.

Each egg-shaped member 32, 42, 52 includes a weighted base 34, 44, 54. A weight device (not shown) or ballast material may be mounted within the egg-shaped member or separately attached to the bottom portion of the member. The weighted base 34, 44, 54, effectively operates to maintain operative members 14, 16, 21 in an upright, vertical position at all times permitting the eating utensils 30, 40, 50 to wobble without completely tipping over. When eating utensils 30, 40, 50 are placed on a surface such as on a table or a high chair table, or when such devices 30, 40, 50 fall to the floor, the egg-shaped, weighted member 32, 42, 52 operates to prevent the fork 14, spoon 16, and knife 21 from coming into contact with a potentially contaminated surface.

Figure 12:
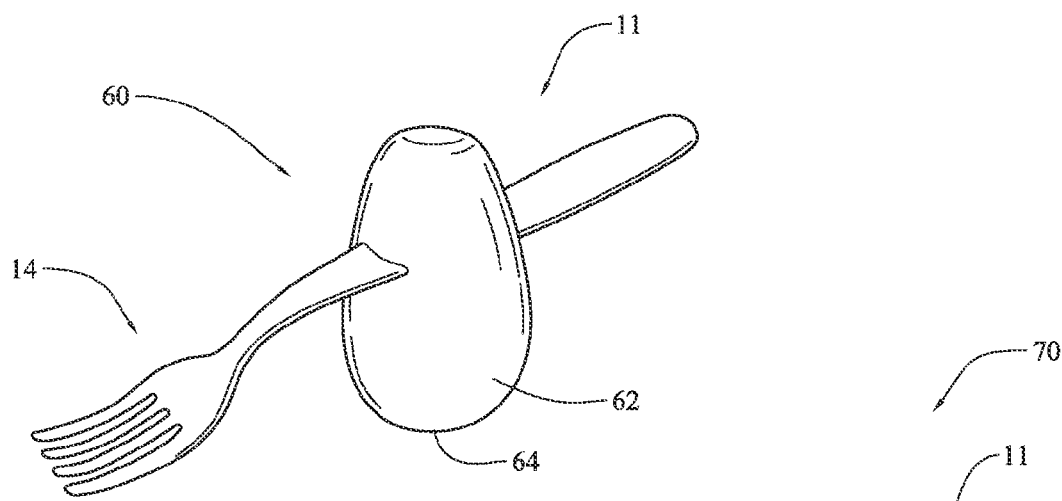
FIGS. 12, 13, and 14 present perspective views of different eating utensils, each showing an operative member oriented generally horizontally within the egg-shaped member, in accordance with another embodiment of the present invention.
Figure 13:
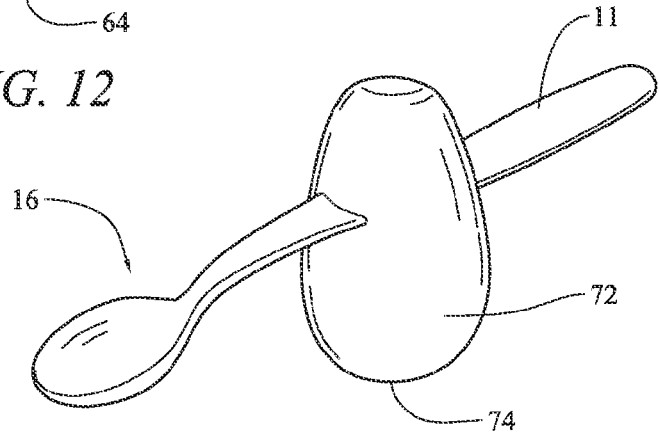
Figure 14:
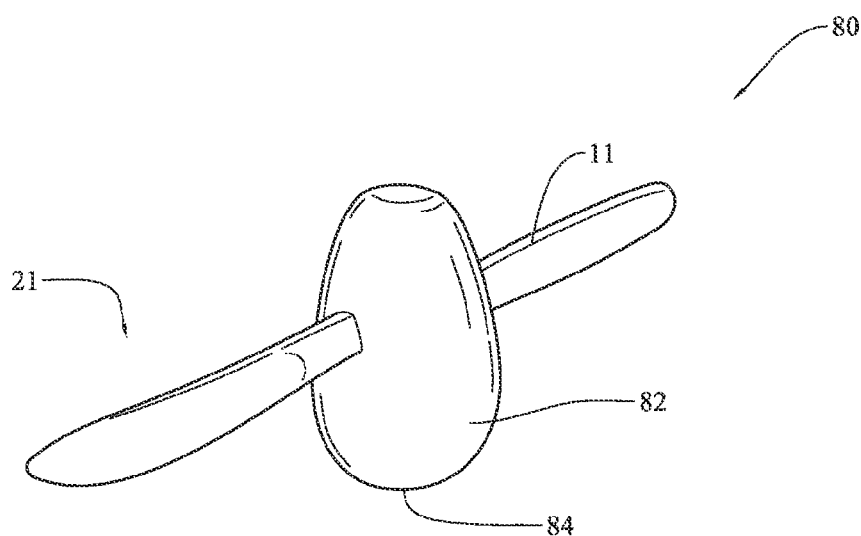

FIGS. 12 through 14 illustrate perspective views of eating utensils, in accordance with yet another embodiment of the present invention. Eating utensils 60, 70, and 80 comprise the same elemental, operative features as those depicted in FIGS. 9 through 11 with the exception that each operative member 14, 16, 21 is oriented horizontally within the egg-shaped member 62, 72, 82, respectively. In this non-limiting embodiment, each egg-shaped member 62, 72, 82 includes a lateral slot formed completely through the body of the egg-shaped member 62, 72, 82, and dimensioned for receiving the shank 11 of members 14, 16, 21. Again, a bonding agent, mechanical fasteners or welding or compression techniques may be used to secure the shanks 11 firmly within the members 62, 72, 82.

Because each egg-shaped member 62, 72, 82 includes a weighted base 64, 74, 84 when the eating utensils 60, 70, 80 are placed on a surface such as on a table or a high chair table, or when the utensils 60, 70, 80 fall to the floor, the egg-shaped, weighted members 62, 72, 82 prevent the operative members 14, 16, 21 from coming into contact with a potentially contaminated surface.

It will be understood that eating utensils 30, 40, 50, 60, 70, and 80 may be constructed as one integral piece thus eliminating the need for assembly. The utensils may be constructed using well-known molding practices or techniques.

Figure 15:
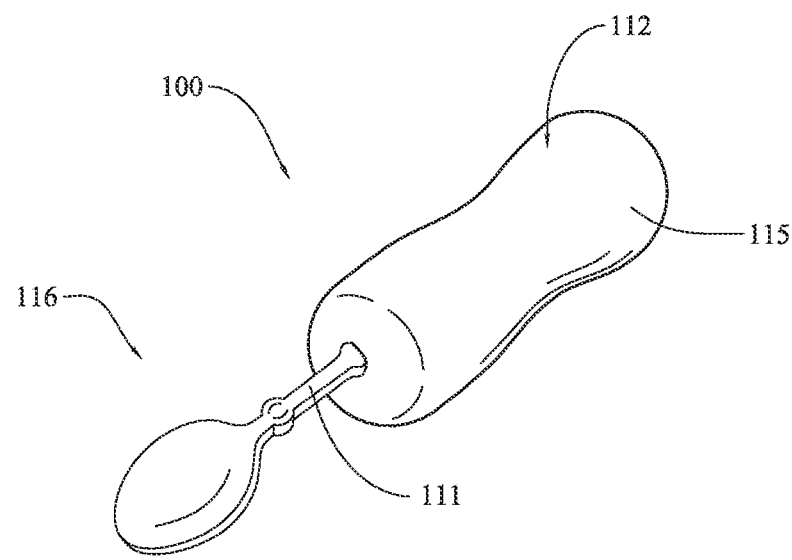
FIG. 15 presents a perspective view of an eating utensil including conventional flatware such as a spoon mounted within a handle, in accordance with yet another embodiment of the present invention.

FIG. 15 illustrates a perspective view of an eating utensil 100, in accordance with another embodiment of the present invention. The operative features and elements of FIG. 15 are similar to that of FIG. 1 with the exception that handle 112 of the eating, utensil 100 is designed and configured for use with conventional flatware 116. Like the eating utensil 10 of FIG. 1, the handle 112 is dimensioned and configured to provide a user with a comfortable grip and to facilitate maneuverability of the utensil 100 by a user suffering from limited motor skills. In this embodiment, the body 115 includes an elongated slot that extends longitudinally within the body 115. The elongated slot is sized and dimensioned to receive the shank 111 of a conventional flatware 116 axially within the body 115 of the handle 112. The slot may include friction features so as to firmly hold and secure the shank of conventional flatware 116 firmly within the body 115. Preferably, the shank 111 is temporarily affixed within the body 115 of the handle 112. The advantage of the eating utensil 100 allows a user to interchange or replace the flatware 116 without requiring the use of multiple handles 112.

Figure 16:
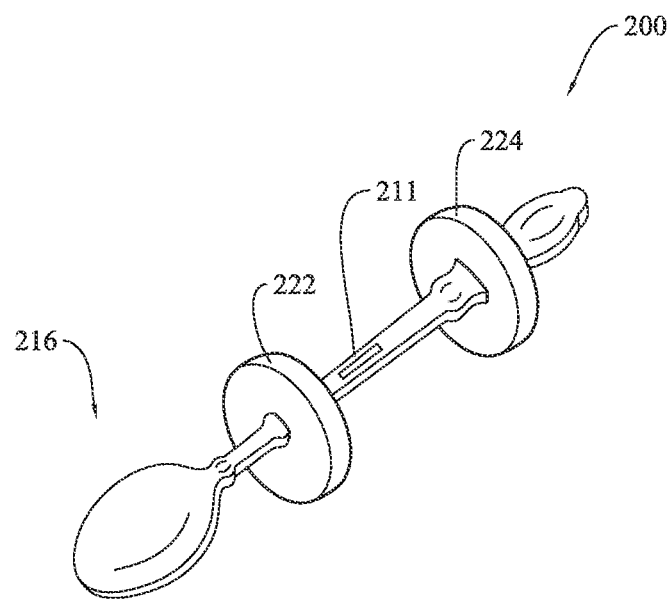
FIG. 16 presents a perspective view of an eating utensil including conventional flatware such as a spoon including supports inserted on the shank of the spoon, in accordance with still another embodiment of the present invention.

FIG. 16 illustrates a perspective view of an eating utensil 200, in according with yet another embodiment of the present invention. The operative features and elements of FIG. 16 are similar to that of FIG. 5 with the exception that the supports 222, 224 are designed and configured for use with conventional flatware 216. Each support 222, 224 includes an aperture for receiving the shank 211 of a conventional eating utensil 216 shown herein as a spoon for illustrative purposes. In one non-limiting embodiment, each support 222, 224 may be constructed from a rubber material having an aperture that firmly receives the shank 211 of the flatware 216. The supports 222, 224 are designed and constructed to firmly remain in place when inserted onto the shank 211. The beneficial feature of the supports 222, 224 allows a user to place the eating utensil 200, in any orientation, on a horizontal surface to avoid contaminating the spoon 216.

Figure 17:
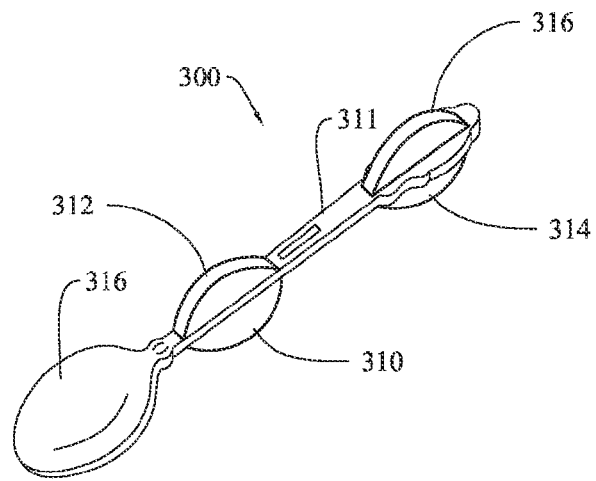
FIG. 17 presents a perspective view of an eating utensil including a spoon having a shank with a plurality of projections, in accordance with yet another embodiment of the present invention.
Figure 18:
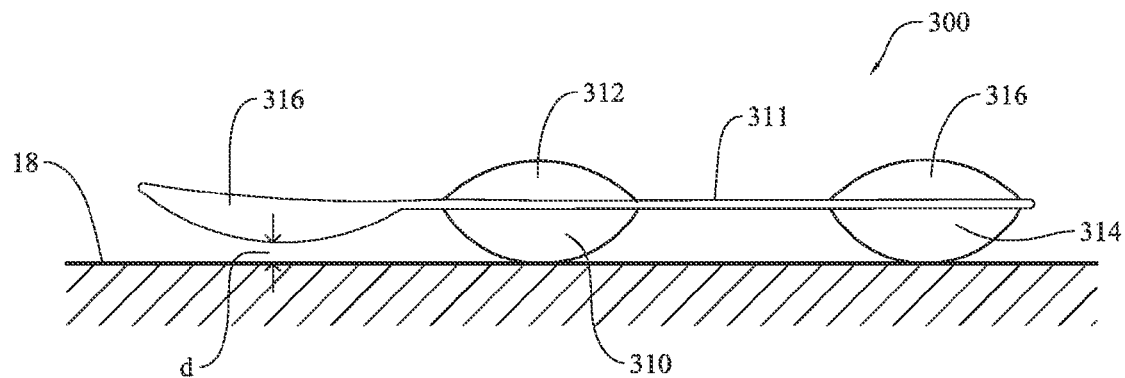
FIGS. 18 and 19 present side views of the eating utensil of FIG. 17, showing the utensil resting on a horizontal surface with a distal operative member elevated above the surface.
Figure 19:
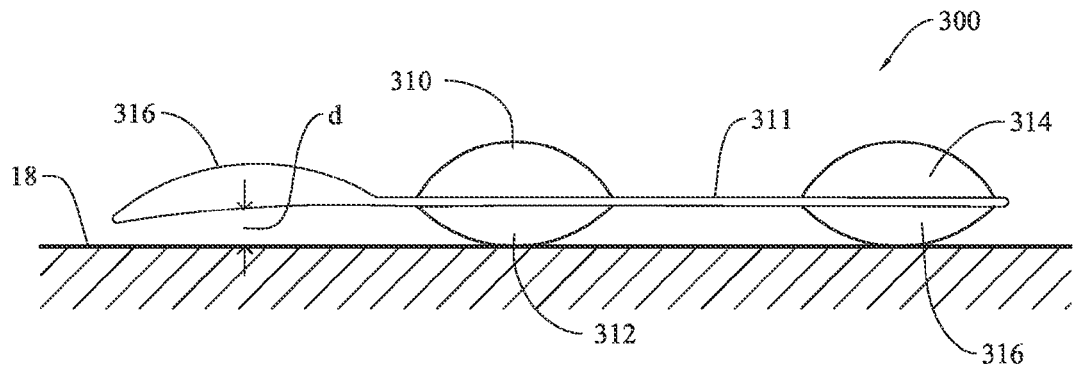

Turning to FIGS. 17 through 19, there are shown perspective and side views, respectively, of an eating utensil 300, in accordance with another exemplary embodiment of the present invention. The eating utensil 300 includes an operative member 316, shown as a spoon for illustrative purposes, integral with an elongated shank 311. A first pair of projections 310, 314 is disposed along the bottom surface of shank 311 and extends downwardly from the underside of shank 311. A second pair of projections 312, 316 is disposed along the top surface of shank 311 and extends upwardly from the upper surface of shank 311. As seen, the bottom projections 310, 314 correspondingly align directly opposite that of the top projections 312, 316, respectively. Although in the illustrated embodiment, projections 310, 312, 314, 316 comprise generally semi-circle shapes, it will be understood that projections 310, 312, 314, 316 may comprise any shape and size and may be fabricated from any suitable material such as rubber, plastic, wood, or ceramic. For example, projections 310, 312, 314, 316 may include a triangular shape, a square shape, a rectangular shape, and the like. Also, projections 310, 312, 314, 316 can be integrally formed with shank 311 or alternatively, projections 310, 312, 314 and 316 may comprise circular discs that are coupled to the shank 311 to provide upper and lower projections.

As better illustrated in FIGS. 18 and 19, projections 310, 312, 314, 316 are sized and dimensioned to elevate the spoon 316 of the eating utensil 300 above the surface 18. The beneficial feature of the projections 310, 312, 314, 316 is to elevate the spoon 316 above the surface 18 to avoid contaminating the spoon 316 with germs or bacteria. Thus, the relative length of projections 310, 312, 314, 316 define the distance d in which the spoon 316 will be elevated from the surface 18.

Figure 20:
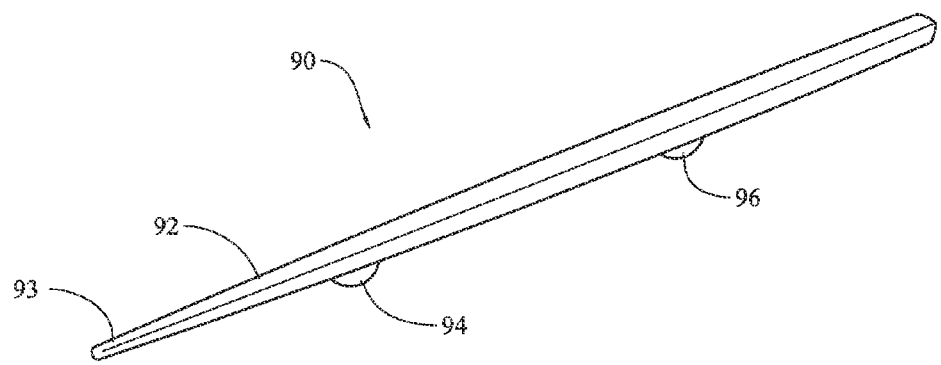
FIG. 20 presents perspective view of an eating utensil including a chopstick having supports, in accordance with another embodiment of the present invention; and finally
Figure 21:
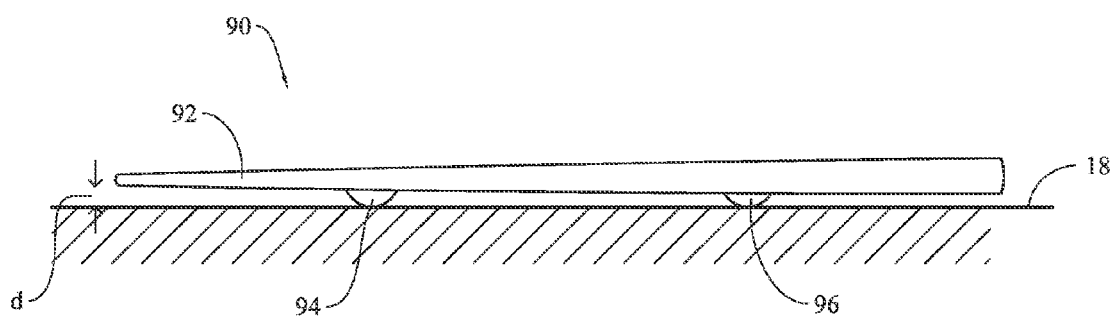
FIG. 21 presents a side view of the chopstick of FIG. 20.

An alternative form of an eating utensil is depicted in FIGS. 20 and 21, which illustrate a perspective view and aside view, respectively, of an eating utensil comprising an exemplary chopstick 90. The chopstick 90 includes an elongated body 92 having a tapered food contact end 93 and atop surface and a bottom surface. Two projections or supports 94, 96 are situated on the bottom or underside surface of the body 92. The supports 94, 96 may be integrally formed with the chopstick body 92 or separately attached to underside of the body 92 using well-known bonding techniques. The chopstick 90 is typically fabricated from bamboo, wood, or plastic. The supports 94, 96 prevent the front end 93 of the chopstick 90 from coming into contact with a potentially contaminated surface 18 when the chopstick 90 is placed onto the surface 18. As better illustrated in FIG. 21, the front eating end 93 of the chopstick 90 is elevated from the surface 18 a distance d via, supports 94, 96. The distance d is predetermined by the shape and size of supports 94, 96. As such, larger projecting supports 94, 96 will result in an increase in distance d.

Although the present invention is described by way of various eating utensils 10, 20, 30, 40, 50, 60, 70, 80, 90, 100, 200, 300 such as spoons, forks, chopsticks, and knives, it is contemplated that other utensils, tools, objects or instruments can be modified to incorporate the functional features of the present invention. Exemplary forms of other utensils may include cooking utensils such as ladles, spatulas, strainers, whisks, stirrers, tongs, turners, spoodles, cooking spoons, scrapers, and cooking forks; hygienic utensils such as toothbrushes, combs, brushes, curling irons, hair dryers, toothpicks and scrubbers; laboratory utensils that include any of stirrers, pipettes, syringes, laboratory tools, or any other tool or instrument having a distal functional or operative member attached to a handle, where an individual wishes to avoid contaminating the distal operative member of the device when resting the utensil, object, tool or instrument on a horizontal surface 18.

The embodiments of the present invention provide a number of different eating utensils 10, 20, 30, 40, 50, 60, 70, 80, 90, 100, 200, 300 configured for elevating the distal operative member of a utensil, such as a fork, a spoon and a knife, above a potentially contaminated surface to avoid contamination. Further, eating utensils 10, 30, 40, 50, 60, 70, 80, and 100 include an enlarged handle adapted to provide small children and adults having physical impairments better control in manipulating the eating utensil during use. The embodiments of the present invention may further include user identification disposed on the outer surface of the body of the eating utensil 10, 20, 30, 40, 50, 60, 70, 80, 90, 100, 200, 300 such as icons, numbers, letters, characters, or other indicia. Also, any of the utensils may include a tether or strap to prevent the device from falling to the floor when released by a user. Further, aesthetically pleasing patterns, designs and colors may also be implemented if desired.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

I claim:

1. A self-positioning utensil comprising:
   an implement having a distal operative end integral with an elongated shank;
   an egg-shaped member including a weighted base and a slot formed within said egg-shaped member, said weighted base configured for maintaining said egg-shaped member in vertical orientation when said egg-shaped member sits on a horizontal surface; and
   Said egg shaped member comprising a major axis and a minor axis, wherein said slot extends completely and laterally through said egg shaped member aligned in a direction substantially perpendicular to said major axis;
   wherein said shank is permanently or removeably secured within said slot so that said distal operative end extends outwards from said egg-shaped member.

2. A self-positioning utensil as recited in claim 1, wherein said implement includes any one of a fork, a knife, a spoon, a ladle, a spatula, a scoop, a whisk, an ice cream scoop, a turner, or any other handheld tool.

3. A self-positioning utensil as recited in claim 2, wherein said egg-shaped member is sized to facilitate grasping by child and an adult.

4. A self-positioning utensil as recited in claim 3, wherein said weighted base includes one or more weights or ballast secured within or attached to a lower portion of said egg-shaped member to allow said egg-shaped member to wobble on a surface without completely tilting over on a side.

* * * * *